United States Patent
Festner et al.

(10) Patent No.: US 12,209,569 B2
(45) Date of Patent: Jan. 28, 2025

(54) WIND TURBINE ROTOR BLADE, KIT, PRESSURE PIECE AND METHOD FOR CONNECTING TWO ROTOR BLADE SEGMENTS

(71) Applicant: Nordex Energy SE & Co. KG, Hamburg (DE)

(72) Inventors: Gerald Festner, Klein Krams (DE); Torsten Wackrow, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/254,843

(22) PCT Filed: Nov. 3, 2021

(86) PCT No.: PCT/EP2021/080503
§ 371 (c)(1),
(2) Date: May 26, 2023

(87) PCT Pub. No.: WO2022/111960
PCT Pub. Date: Jun. 2, 2022

(65) Prior Publication Data
US 2024/0026856 A1    Jan. 25, 2024

(30) Foreign Application Priority Data
Nov. 27, 2020 (EP) .................................. 20210363

(51) Int. Cl.
*F03D 1/06* (2006.01)
*F03D 13/10* (2016.01)

(52) U.S. Cl.
CPC ......... *F03D 1/0677* (2023.08); *F03D 13/104* (2023.08); *F05B 2230/60* (2013.01); *F05B 2240/302* (2013.01)

(58) Field of Classification Search
CPC .... F03D 1/0677; F03D 1/0675; F03D 13/104; F03D 13/10
See application file for complete search history.

(56) References Cited

U.S. PATENT DOCUMENTS 8,245,400 B2 * 8/2012 Stam ..................... F03D 1/0675
416/223 R
8,510,947 B2 * 8/2013 Kirkpatrick ............. B23P 15/04
29/415

(Continued)

FOREIGN PATENT DOCUMENTS

DE 11 2010 003 218 T5 7/2012
EP 2 391 807 B1 4/2015

(Continued)

OTHER PUBLICATIONS

Written Opinion of the International Searching Authority dated Jan. 26, 2022 for international application PCT/EP2021/080503 on which this application is based.

(Continued)

*Primary Examiner* — Michael L Sehn
(74) *Attorney, Agent, or Firm* — Walter Ottesen, P.A.

(57) ABSTRACT

A segmented wind turbine rotor blade includes sleeve-shaped pressure pieces arranged between rotor blade segments, each of which is mounted on a connecting bolt. Each pressure piece includes one or more cylindrical sections and a tool engaging section for an assembly tool). Each pressure piece is connected to a corresponding connecting bolt in a form fit manner, so that a screwing force can be applied to the corresponding connecting bolt via the assembly tool via the pressure piece. A diameter of the cylindrical section(s) is less than a diameter of the tool engaging section. Each two adjacent pressure pieces are arranged rotated by 180° relative to one another.

19 Claims, 8 Drawing Sheets

(56) References Cited

U.S. PATENT DOCUMENTS

| | | | |
|---|---|---|---|
| 9,797,369 B2 * | 10/2017 | Kratmann | ............ F03D 1/0633 |
| 2012/0055020 A1 | 3/2012 | Stam et al. | |
| 2013/0108464 A1 | 5/2013 | McEwen et al. | |
| 2014/0334934 A1 | 11/2014 | Kannenberg et al. | |
| 2017/0045032 A1 | 2/2017 | Jacobsen et al. | |

FOREIGN PATENT DOCUMENTS

| | | |
|---|---|---|
| EP | 2 788 617 B1 | 8/2019 |
| EP | 3 581 790 A1 | 12/2019 |
| JP | 2006-329109 A | 12/2006 |
| WO | 2015/124568 A1 | 8/2015 |

OTHER PUBLICATIONS

International Search Report of the European Patent Office dated Jan. 26, 2022 for international application PCT/EP2021/080503 on which this application is based.

Search Report of the European Patent Office dated May 26, 2021 for European application 20210363.6 on which this application is based.

* cited by examiner

WIND TURBINE ROTOR BLADE, KIT, PRESSURE PIECE AND METHOD FOR CONNECTING TWO ROTOR BLADE SEGMENTS

CROSS-REFERENCE TO RELATED APPLICATIONS

This application is a continuation application of international patent application PCT/EP2021/080503, filed Nov. 3, 2021, designating the United States and claiming priority from European application 20210363.6, filed Nov. 27, 2020, and the entire content of both applications is incorporated herein by reference.

TECHNICAL FIELD

The disclosure concerns a wind turbine rotor blade with at least two rotor blade segments, a kit for connecting two rotor blade segments, a pressure piece for connecting two rotor blade segments and a method for connecting two rotor blade segments.

BACKGROUND

Wind turbines with wind turbine rotor blades are widely known from the state of the art and are used to convert wind energy into electrical energy. Wind turbines include a multitude of components which are connected to each other, for example via a flange connection. For example, in the area of a rotor blade root, the rotor blades include a rotor blade connection with a number of connecting means integrated into the laminate, via which the rotor blades are connected to a bearing ring of a so-called pitch bearing or to a component connected to the bearing ring, such as a so-called extender of the wind turbine, via fastening screws or fastening bolts. The connecting means can, for example, be configured as transverse bolts or bushings and be part of a flange insert for the rotor blade connection. Such a configuration is known from international application WO 2015/124568 A1.

Alternatively, (flanged) connections are also used for connecting rotor blade segments which, arranged and joined together lengthwise, form a rotor blade. Such a rotor blade is called a split or segmented rotor blade. For example, connecting means are then located in the laminate of a respective connecting end or dividing flange of the rotor blade segments. The rotor blade segments can be connected to each other via bolts either directly or via suitable intermediate pieces.

Segmented rotor blades are preferred especially for transport reasons and are becoming increasingly important, especially due to the increasing overall length of rotor blades.

SUMMARY

It is an object of the disclosure to specify a concept for segmented rotor blades which ensures a particularly advantageous connection of rotor blade segments.

According to a first aspect a wind turbine rotor blade is disclosed, which is formed by at least two rotor blade segments. The segments are screwed together at respective connection ends via a plurality of connecting bolts. Between the rotor blade segments sleeve-shaped pressure pieces are arranged, each of which is mounted to a connecting bolt. Each pressure piece includes one or more cylindrical sections and a tool engaging section for an assembly tool. Each pressure piece is connected to a corresponding connecting bolt in a form fit manner, so that a screwing force can be applied to the corresponding connecting bolt via the assembly tool via the pressure piece. A diameter of the cylindrical section(s) is less than a diameter of the tool engaging section. Each two adjacent pressure pieces are arranged rotated by 180° relative to one another, so that—along a direction from one rotor blade segment towards the other rotor blade segment—a first axial region is formed in which cylindrical sections of the two adjacent pressure pieces lie opposite one another, a second axial region is formed in which the tool engaging portion of one of the pressure pieces opposes a cylindrical portion of the other of the pressure pieces and a third axial region is formed in which the tool engaging portion of the other of the pressure pieces opposes a cylindrical portion of the one of the pressure piece.

For connecting the two rotor blade segments of a wind turbine rotor blade, these typically include a large number of corresponding connecting elements, such as bushings, at the connection ends to be connected. The connecting elements are used to create a large number of bolt connections between the two segments. The assembly is configured in such a way that the connecting bolts are first screwed into a connection end of one rotor blade segment, for example, into the bushings. Then the sleeve-shaped pressure pieces are pushed onto the connecting bolts before the free ends of the connecting bolts are threaded into the corresponding connecting element of the other rotor blade segment and at least partially screwed in. Finally, the two rotor blade segments are bolted together, whereby the connection is firmly screwbolted and pretensioned using the assembly tool. Thus, the pressure pieces are clamped between the rotor blade segments.

A wind turbine rotor blade according to the disclosure provides pressure pieces, which have a special configuration regarding cylindrical sections and tool engaging sections. In particular, axial lengths of these sections are configured such that—for two adjacent pressure pieces—the above described three axial regions are formed. Since the diameters of the cylindrical sections and tool engaging sections of the pressure pieces are different as defined above, the alternating arrangement of the pressure pieces provides different distances between two adjacent pressure pieces along their longitudinal axes, that is, free spaces, which are efficiently provided and used. This arrangement provides a lot of advantages as explained in the following.

The solutions according to the disclosure enable an effective use of the installation space. In particular, a comparatively small distance of adjacent pressure sleeves to each other by same size of the assembly tool can be achieved, in particular due to the nested arrangement of the pressure pieces. In such nested arrangement, the tool engaging sections of two adjacent pressure pieces are not opposing each other related to their longitudinal axes. Thus, the solution contributes to the fact that the pressure pieces require considerably less installation space. As a result, the small distance between the pressure pieces allows a comparatively high number of screw-connections to be made between the segments over the circumference in their connection area.

Furthermore, a shorter installation time can be achieved, since the assembly tool not necessarily needs to be opened during a complete screwing process of one pressure piece or connecting bolt respectively. Rather, the tool can be easily repositioned in the first axial region, for example, by rotating it in a closed state around a respective pressure piece.

Further, the solution enables a particularly simple and inexpensive production of pressure pieces, especially from simple semi-finished tube products. This enables particularly low manufacturing costs.

The solution further helps to achieve a particularly rigid connection of both blade segments. It enables the absorption and transmission of particularly high tensile and compressive forces between the two rotor blade segments. Furthermore, a particularly efficient power transmission from one segment to the second segment is made possible exclusively via the connecting bolt. In other words, the blade segments are detachably joined without force deflection as with eccentric screw connections or intermediate pieces that are subject to tensile or bending loads. This also enables a very good material utilization. It contributes to a low tendency for the connection to slacken and to a bending load on the screw connections, especially in contrast to conventional flange connections. Furthermore, an even distance between the connecting elements, such as the bushings, and thus connecting ends to each other is ensured over the entire connection circumference.

For example, the assembly tool is a hydraulic torque tool, for example, an open swing tool. The assembly tool can also be named mounting tool or screw tool. In a closed state the assembly tool fully surrounds a pressure piece, at least with an engaging or wrapping part. The engaging part is, for example, formed in a ring-like manner. For example, in the closed state, the open swing tool can be positioned in the tool engaging section of a pressure piece, such that a rotation of the assembly tool rotates the pressure piece and thus the respective connecting bolt, due to the form-fit connection of the pressure piece with the respective connecting bolt. The assembly tool can be opened, for example, by opening one swing or swing arm and folding it away.

The pressure piece is configured as a sleeve, that is, the pressure piece includes a continuous bore/opening along a main direction of extension, that is, a longitudinal axis. The pressure piece is configured as a clamping sleeve, for example.

In an axial region, a whole cylindrical section or a part of a cylindrical portion can be arranged.

The positive-locking connections (form-fit connections) between pressure pieces and bolts are such that a torque about the longitudinal axis of a pressure piece can be transmitted to the inserted connecting bolt for screwing. In other words, the form-fit connections are torque-proof.

A connecting bolt, for example, is a screw bolt. The connecting bolt is, for example, configured as an expansion shaft bolt (with corresponding external threads).

The connecting elements mentioned, such as the bushings, are, for example, elements laminated into the connecting ends of the blade segments. It is also conceivable that the two connecting elements are formed by dividing an overall connecting element. In this case, the rotor blade would first be manufactured as a whole, that is, with a one-piece shell, and then separated at one point of division, for example by cutting or sawing. The separation takes place in the area of the overall connecting elements, so that two connecting element halves are created per overall connecting element, one for each of the two blade segments created by division.

The cylindrical and tool engaging sections relate to the outer circumference of a pressure piece. The tool engaging section is, for example, hexagonal shaped section, wherein the assembly tool is configured accordingly to engage the pressure pieces in the respective tool engaging section.

The term adjacent means directly arranged pressure pieces next to each other along the circumference of the wind turbine rotor blade.

The term diameter refers to the outer diameter and in particular preferably means the maximum outside diameter in the respective area or of the respective element.

According to an embodiment an axial length of the first axial region corresponds to at least one width of the assembly tool.

According to an embodiment an axial length of the second and/or third axial region corresponds to at least one width of the assembly tool.

According to an embodiment a width of the tool is up to 20 to 40 mm. The width of the assembly tool is for example a wrench width, for example, of a wrapping part of the open swing tool.

According to an embodiment the pressure pieces are each formed by a cylindrical portion including an axial length of at least twice the width of the mounting tool and the tool engaging portion having an axial length of at least the width of the mounting tool. This is a possible, easy to produce solution enabling the above mentioned functions and advantages.

According to an embodiment the pressure pieces each include a further cylindrical portion having an axial length at least the width of the mounting tool, with the tool engaging portion being located between the two of the cylindrical portions. This is a further possible solution for a pressure piece, wherein, for example, for two adjacent pressure pieces two first axial regions are formed, which allow for mounting/releasing or repositioning of the assembly tool.

According to an embodiment a diameter of a pressure piece in the first axial region is such that the assembly tool can freely rotate coaxially around the respective pressure piece in the first axial region, in particular the diameter is 64 mm, 74 mm, 79 mm or another value, for example, less or more than the given values, depending on which size is necessary—however 1 mm less than a used wrench size or less. Thus, a free space is defined between two adjacent pressure pieces, large enough in order to allow the tool to rotate at least partially around a respective pressure piece.

As an example, the diameter of a pressure piece in the first axial region is smaller than a wrench size of the assembly tool, which allows for the free rotation of the tool. Further, the free space is just as large that the tool can be opened and closed for releasing the tool from a pressure piece or placing it onto a pressure piece. This also allows for an easy repositioning of the tool, for example, in order to re-engage the same tool engaging section for further screwing of a same pressure piece. During repositioning, opening of the assembly tool, for example, its surrounding or wrapping part, is not necessary. Furthermore, non-ratcheting tools possible.

According to an embodiment a clearance between two adjacent pressure pieces in the second and/or third axial region is smaller than a clearance in the first axial region, in particular the clearance is 10 mm or smaller.

The clearance is large enough that the assembly tool—in a state engaging the tool engagement section—can be rotated to screw the corresponding connecting bolt.

According to an embodiment, in the first axial region the clearance between two adjacent pressure pieces is maximum, in particular compared to the clearance between all remaining portions of the two adjacent pressure pieces.

According to an embodiment a pressure piece includes uniformly formed cylindrical sections at opposite ends. Thus, the front surfaces (contact surfaces to the rotor blade segments and in particular to the inserts like sleeves or bushings) are dimensioned essentially identically, so that in principle, friction or contact conditions are the same on both sides of the pressure pieces.

According to an embodiment the plurality of pressure pieces are identically formed. Thus, all pressure pieces are the same, which contributes to comparatively low productions costs and makes the mounting and installation similar for all bolt connections.

According to a further aspect, a kit for connecting two rotor blade segments of a wind turbine rotor blade is disclosed.

The kit essentially enables the above-mentioned advantages and functions. The kit can be further developed according to the above-mentioned embodiments with respect to the first aspect of the present disclosure. Exemplarily, several kits can be provided for all of the used bolt connections.

According to a further aspect, a pressure piece for connecting two rotor blade segments of a wind turbine rotor blade according to any one of the above mentioned embodiments is disclosed. The pressure piece essentially enables the above-mentioned advantages and functions.

According to a further aspect, a method of joining two rotor blade segments of a wind turbine rotor blade according to any one of the above mentioned embodiments is disclosed. The method includes the steps:
partially screwing connecting bolts into the first connection end of the first rotor blade segment in such a way that the connecting bolts project from the first connection end,
providing sleeve-shaped pressure pieces, each including one or more cylindrical portions and a tool engaging portion for an assembly tool, and wherein a diameter of the cylindrical portion(s) is less than a diameter of the tool engaging portion,
form-fit mounting of the pressure pieces to the connecting bolts in such a way that two adjacent pressure pieces are arranged in each case rotated by 180° relative to one another,
bringing the second connection end of the second rotor blade segment close to the first connection end of the first rotor blade segment,
partially screwing the connecting bolts into the second connection end,
attaching an assembly tool to a first pressure piece in the first axial region relative to an adjacent second pressure piece,
aligning and axially moving the assembly tool along the first pressure piece such that the assembly tool engages the first pressure piece in the tool engaging portion; and
screwing the corresponding connecting bolt using the assembly tool.

The method essentially enables the above-mentioned advantages and functions.

According to an embodiment, after the screwing step, the assembly tool is axially displaced back into the first axial region. Then, the assembly tool is then removed and attached to the second pressure piece or the assembly tool is realigned by freely rotating it around the first pressure piece in the first axial region. In other words, the assembly tool is re-adjusted or removed from the first pressure piece to be used for the second pressure piece.

BRIEF DESCRIPTION OF DRAWINGS

The invention will now be described with reference to the drawings wherein.

DETAILED DESCRIPTION

Figure 1:
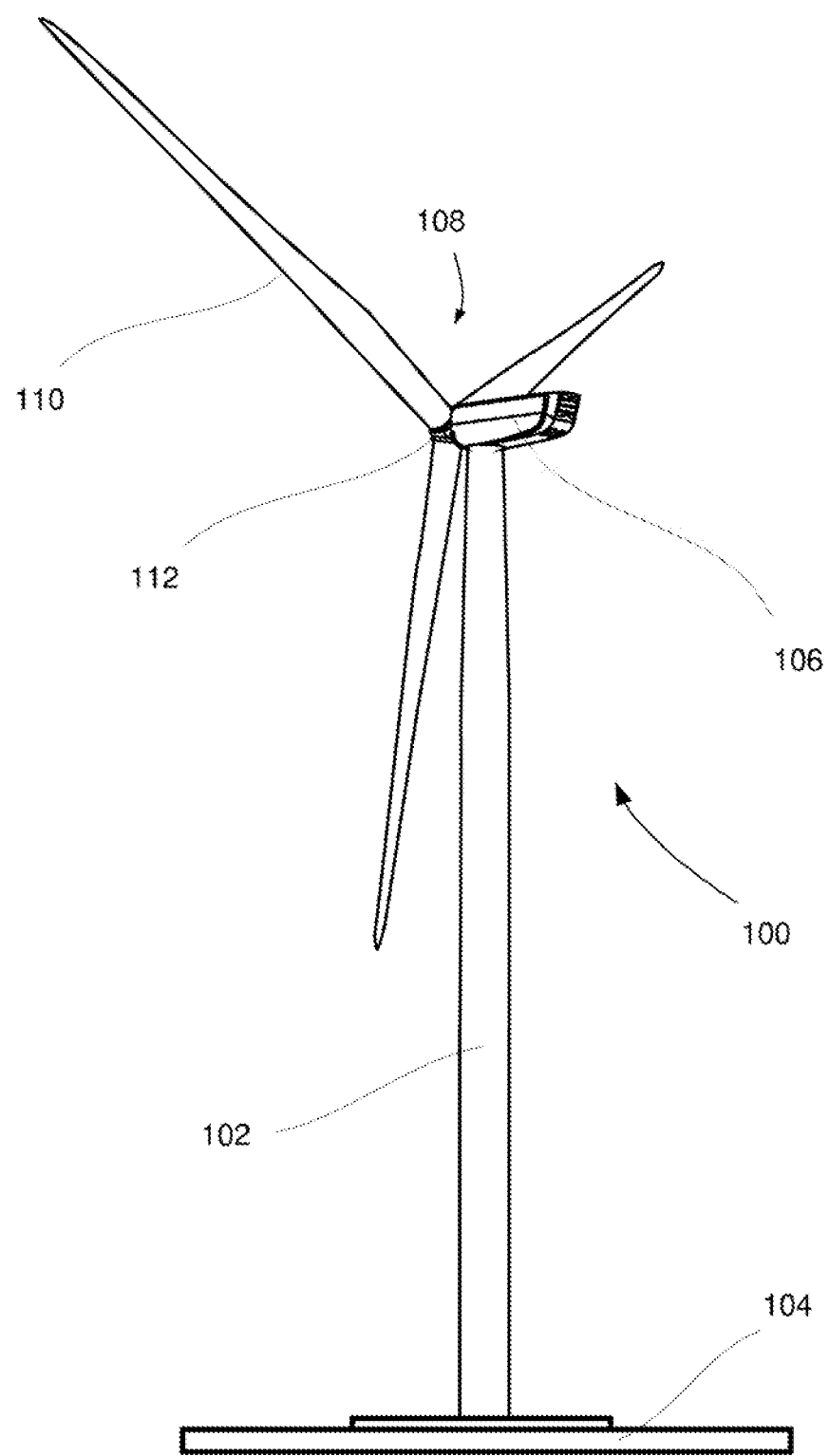
FIG. 1 shows a schematic view of a wind turbine.

FIG. 1 shows a schematic view of a wind turbine 100, which includes a tower 102. The tower 102 is fixed to the ground via a foundation 104. At one end of the tower 102 opposite to the ground a nacelle 106 is rotatably mounted. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the kinetic energy of the rotor 108 into electrical energy.

Figure 2:
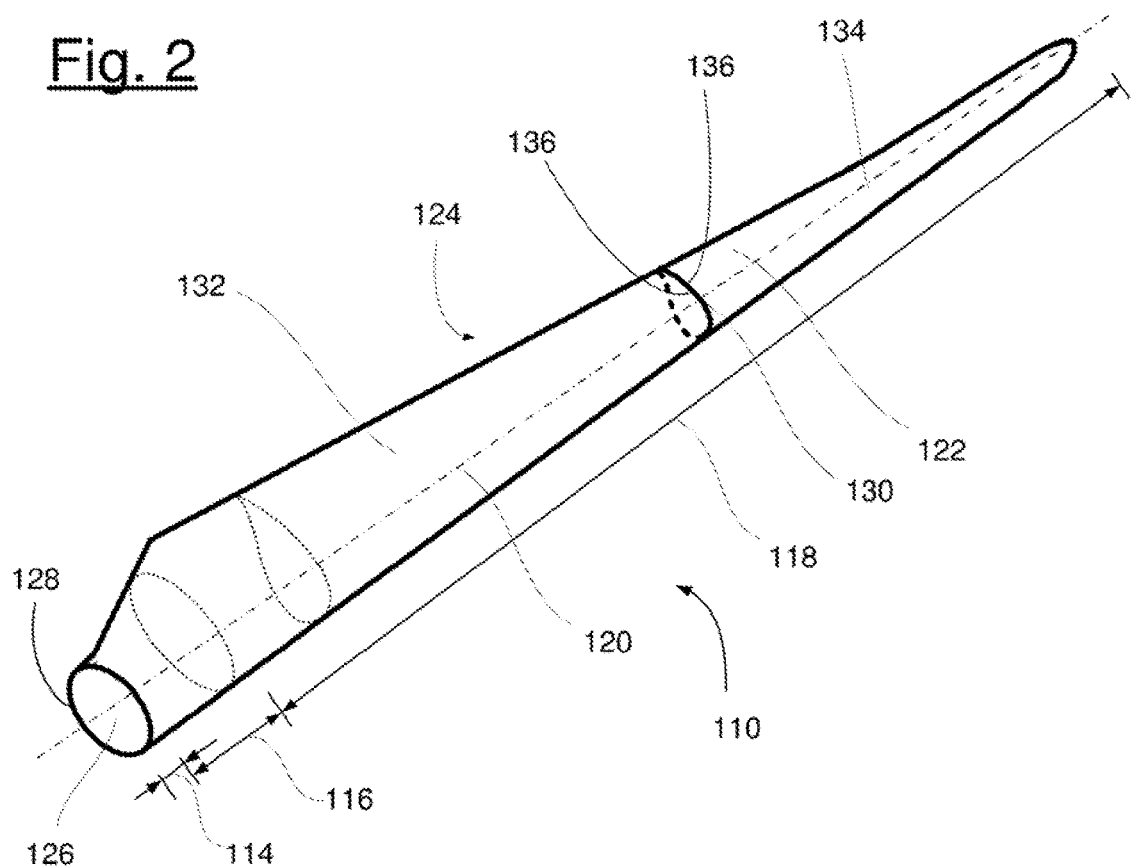
FIG. 2 shows a schematic view of a split rotor blade with two rotor blade segments.

FIG. 2 shows a wind turbine rotor blade 110. The rotor blade 110 has the shape of a conventional rotor blade and has a rotor blade root area 114 facing the rotor hub 112. The rotor blade root area 114 typically has an essentially circular cross-section. The rotor blade root area 114 is followed by a transition area 116 and a profile area 118 of rotor blade 110. The rotor blade 110 has a pressure side 122 and an opposite suction side 124 with respect to a longitudinal extension direction 120 (also main extension direction). The rotor blade 110 is essentially hollow inside.

In the rotor blade root area 114 a rotor blade connection end 126 with a flange connection 128 is provided, via which the rotor blade 110 is mechanically connected to a pitch bearing or an extender.

The rotor blade 110 includes a division area 130 where a blade root-side rotor blade segment 132 and a blade tip-side rotor blade segment 134 are connected to each other. For this purpose, both segments 132, 134 each include a segment connection end 136, 138 (also connection ends). The rotor blade 110 is thus a split rotor blade as described above. Each connection end 136, 138 has a multitude of sleeves or bushings 140, 142, which are arranged according to the profile (in circumferential direction) and include internal threads for the reception of screw bolts, also called bearing bolts or connecting bolts. For example, the first bushings 140 include left-hand threads (first internal threads) and the second bushings 142 right-hand threads (second internal threads) or vice versa. A connection end 136, 138 is realized for example as a flange insert, which is inserted as an insert into a production mold for the manufacture of the rotor blade 110. However, it is also conceivable that no flange insert is provided and the bushings are embedded and laminated directly into the rotor blade half shells. The bushings are steel sleeves, for example.

In the following, the connection of both rotor blade segments 132, 134 will be described in more detail, whereby this will be explained using a single bolt connection as an example.

Figure 3:
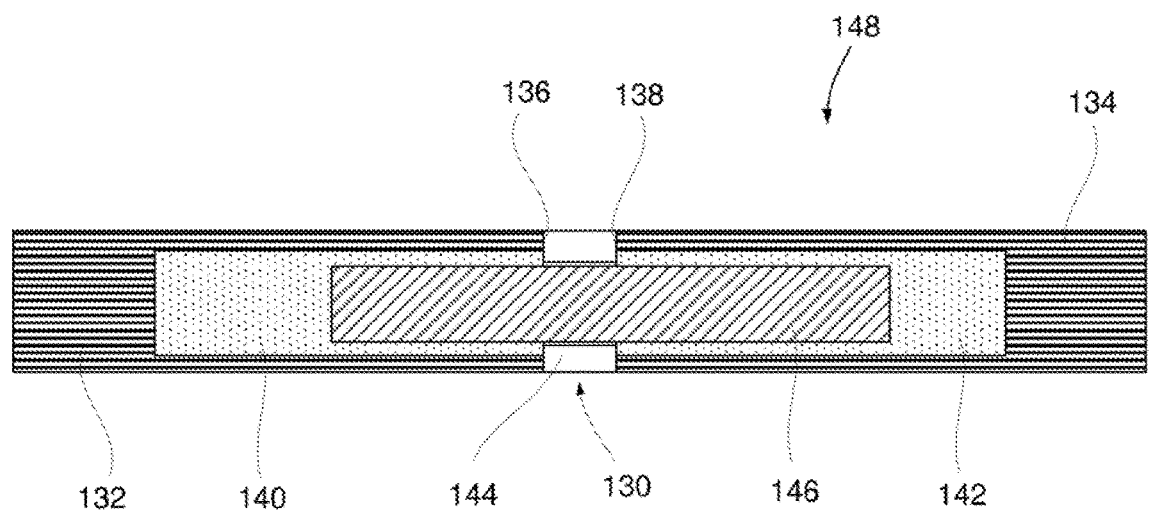
FIG. 3 shows a schematic sectional view of a bolt connection of two rotor blade segments.

FIG. 3 shows a schematic sectional view in a partial area of two connected rotor blade segments 132, 134 at the division area 130, where a single bolt connection 148 is shown. The first connecting end 136 of the first rotor blade segment 132 includes a multitude of first bushings 140 as described above. The second connection end 138 of the second rotor blade segment 134 includes a number of second bushings 142. A connecting bolt 146 is screwed into each pair of aligned first and second bushings 140, 142. This bolt 146 connects the two connection ends 136, 138 and thus the two rotor blade segments 132, 134 mechanically. In addition, a pressure piece 144 is clamped between the two connection ends 136, 138 per bolt connection 148.

Figure 4:
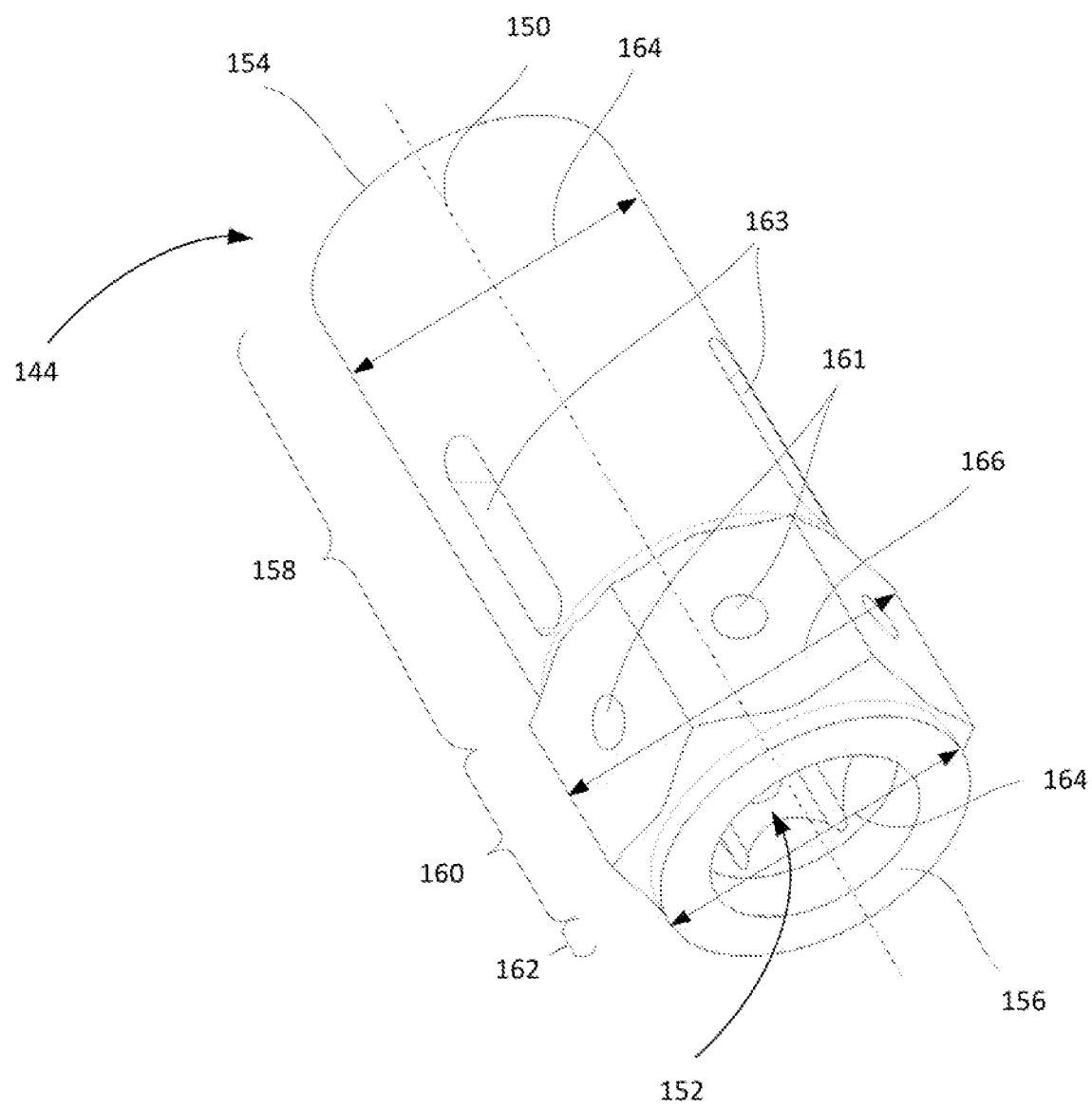
FIG. 4 shows a pressure piece according to an embodiment of the disclosure.

FIG. 4 shows a perspective view of a pressure piece 144 according to an embodiment of the disclosure. The pressure piece 144 is configured as a cylindrical sleeve and is manufactured from a simple semi-finished tube product. The pressure piece 144 includes a (central) longitudinal axis 150 and a continuous bore 152 (general opening). The pressure piece 144 is configured to be pushed onto the connecting bolt 146 (not shown), thereby engaging the bolt 146 in a form-fit manner in order that a rotation applied to the pressure piece 144 is transferred to the bolt 146. The pressure piece 144 has a first axial end 154 and an opposite second axial end 156. Starting from the first axial end 154, the pressure piece 144 has a first cylindrical section 158, a subsequent tool engaging section 160 followed by a short second cylindrical section 162. An outer diameter 164 of the cylindrical sections 158, 162 is smaller than an outer diameter 166 of the tool engaging section 160. In the present embodiment, the cylindrical sections 158, 162 are uniformly formed and include the axial ends 154, 156. This guarantees the same contact conditions of the pressure piece 144 at both rotor blade segments 132, 134. The cylindrical section 158 includes slots 163 serving as windows that allow a view of the connecting bolt 146 (not shown) inside the pressure piece 144.

The tool engaging section 160 has a hexagonal outer shape in order to be engaged by a respective assembly tool, as will be described later. The tool engaging section 160 includes holes 161 in the flat areas of the hexagon. The holes are provided for inserting a bolt-like assembly tool for turning the pressure piece 144 in a pre-assembling step.

Figure 5:
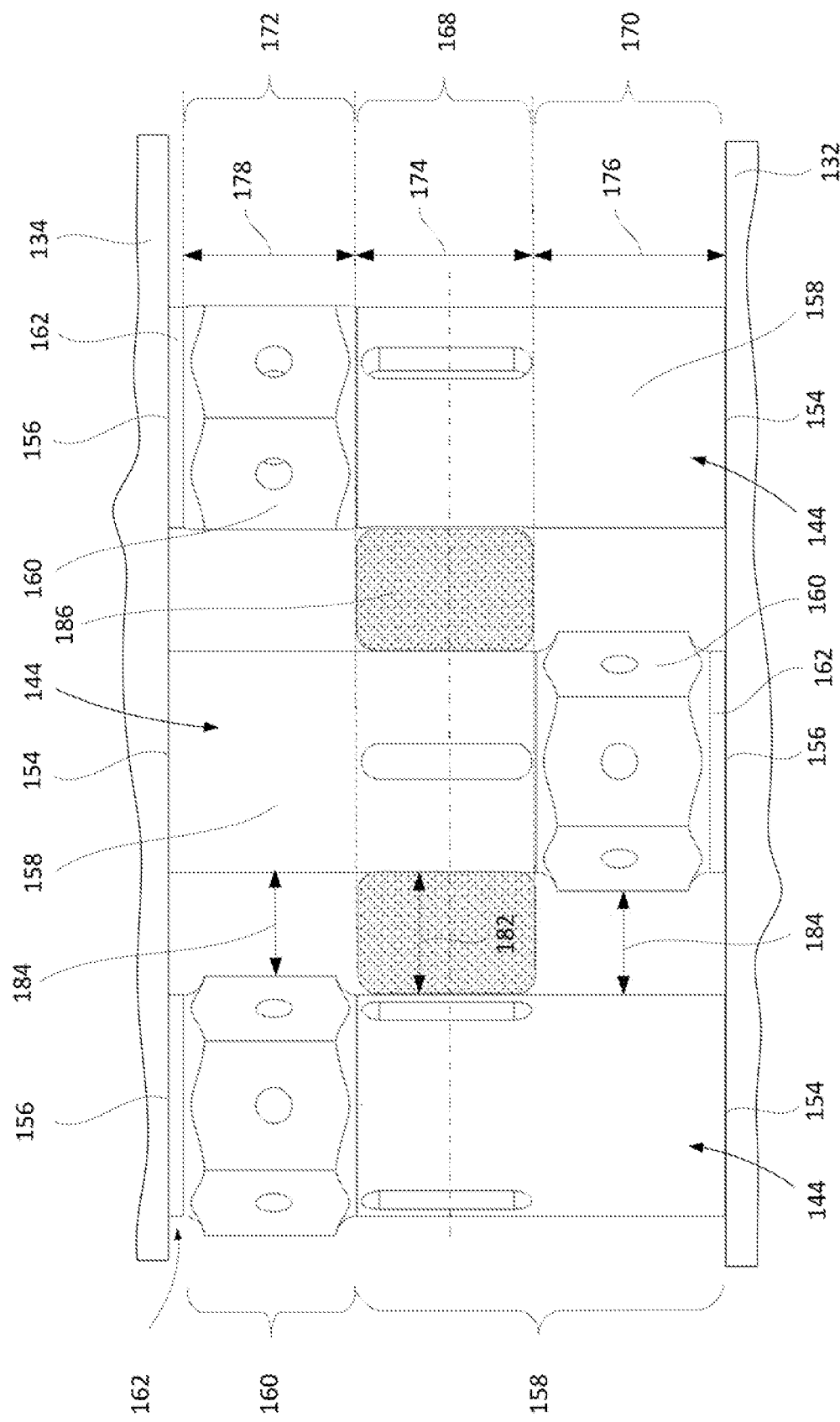
FIG. 5 shows an arrangement of three pressure pieces of FIG. 4 for connection of two rotor blade segments according to an embodiment of the disclosure.

The configuration of the pressure piece 144 according to FIG. 4 enables a special, nested arrangement of several such pressure pieces 144 for the connection of two rotor blade segments as shown in FIG. 5. In FIG. 5, three of such pressure pieces 144 are shown, wherein for sake of clarity, no bolts 146 or bushings 140, 142 are shown and the rotor blade segments 132 are simply indicated by dotted lines. Each two adjacent pressure pieces 144 are arranged 180° rotated to each other. Thus, the pressure pieces 144 alternate along the circumference of the rotor blade 110 with respect to their orientations.

By this arrangement, along the direction from one rotor blade segment, for example, the first segment 132, towards the other rotor blade segment, for example, the second segment 134, several axial regions are formed with respect to two adjacent pressure pieces 144. In a first axial region 168 only cylindrical sections (for example, portions of the first cylindrical sections 158) of two adjacent pressure pieces are arranged, for example, opposing each other. In second and third axial regions 170 and 172 a respective tool engaging section 160 and a cylindrical section (for example, portions of the first cylindrical sections 158) of the respective two adjacent pressure pieces 144 are arranged, for example, opposing each other.

The axial lengths 174, 176 and 178 (for example, axial expansions) of the axial regions 168, 170 and 172 essentially correspond to at least a width 181 of an assembly tool 180, shown in FIGS. 6 to 9. In other words, the first cylindrical section 158 of a pressure piece 144 has a length of at least two times width 181 of the assembly tool 180. In other words, in the presently shown embodiment the first axial region 168 extends from the middle (dotted line) at least half the width 181 of the assembly tool 180 towards both the first and second axial ends 154, 156.

A first clearance 182, for example, distance, between two adjacent pressure pieces 144 in the first axial region 168 is smaller than a second clearance 184, for example, distance, between the two adjacent pressure pieces 144 in the second and third axial regions. Thus, in the first axial region 168 a free space 186 is formed between two adjacent pressure pieces 144, which is larger than spaces in the second and third axial regions 170, 172.

FIGS. 6 to 9 show different mounting stages of one bolt connection 148 with the help of the assembly tool 180. Again, for sake of clarity no rotor blade segments and bolts are shown. Two bushings 140, 142 are at least partially shown. The assembly tool 180 is a hydraulic torque tool, which has an engaging part 188, which is formed ring-like in a closed state. This engaging part 188 specifies the width 181 of the assembly tool 180 in the present embodiment.

Figure 6:
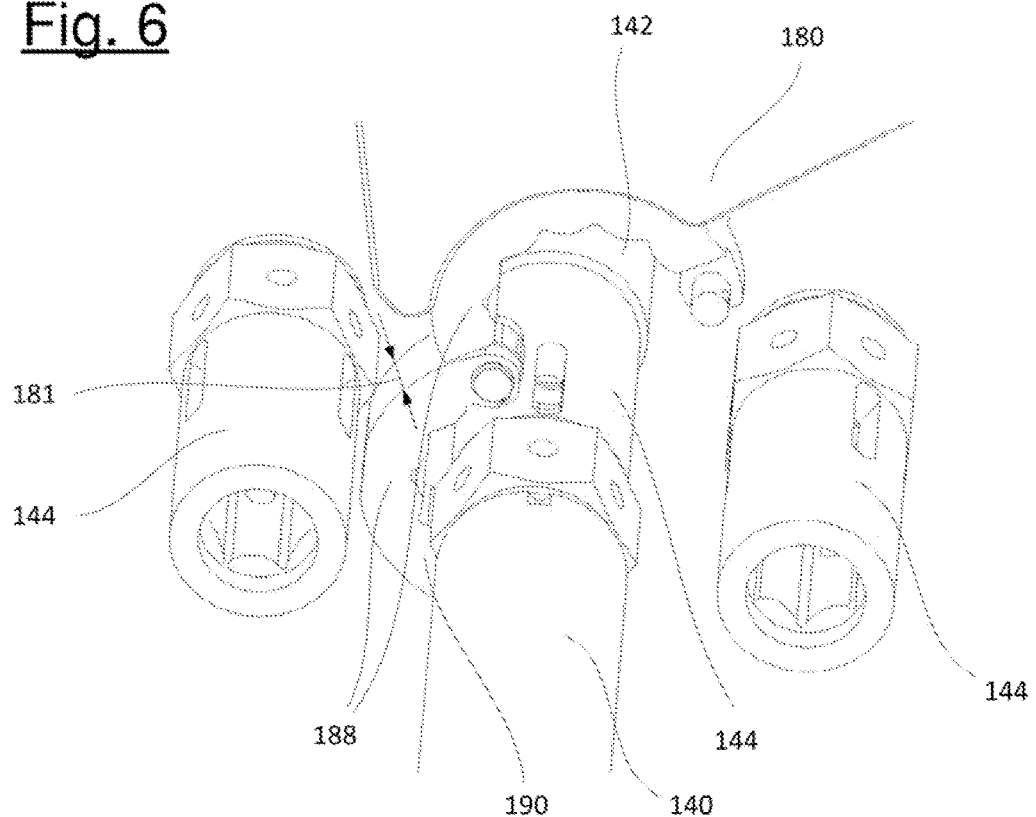
FIGS. 6 to 9 show perspective views of different stages of mounting with an assembly tool according to an embodiment of the disclosure.

In the first axial region, the assembly tool 180 can be attached to or released from a respective pressure piece 144, as is shown in FIG. 6, wherein the engaging part 188 is in an opened state. In this opened state, a swing part 190 is unlocked and folded away.

Figure 7:
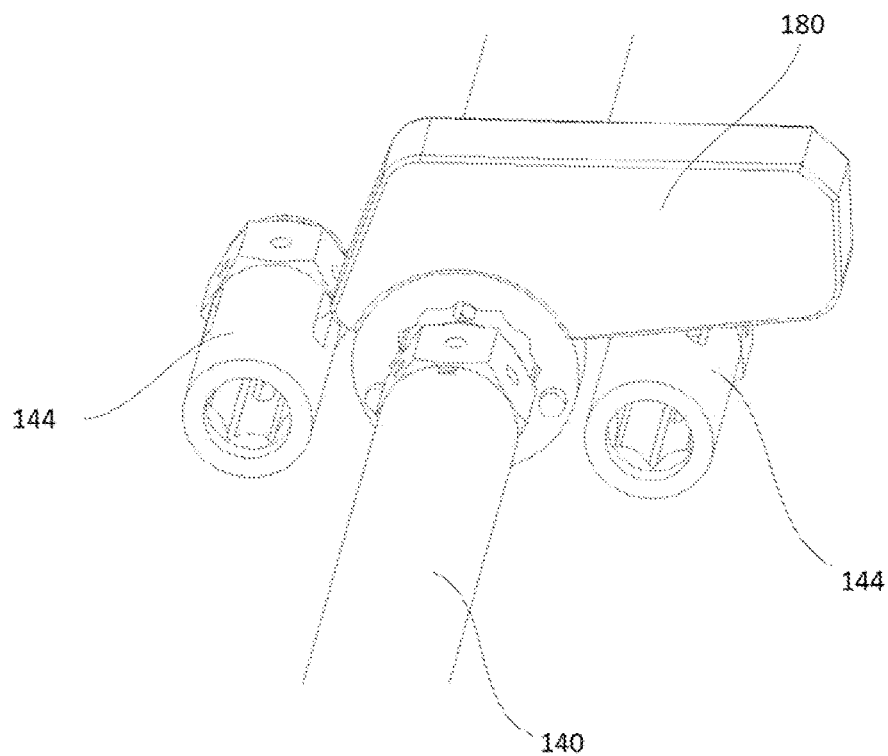

With respect to FIG. 7, after closing the engaging part 188, the engaging part 188 fully surrounds the pressure piece 144. While in the first axial region, the assembly tool 180, for example, the engaging part 188, can freely rotate around the cylindrical section 158 of the pressure piece. In a certain orientation, the assembly tool 180 can then be axially moved over the respective tool engaging section 160.

Figure 8:
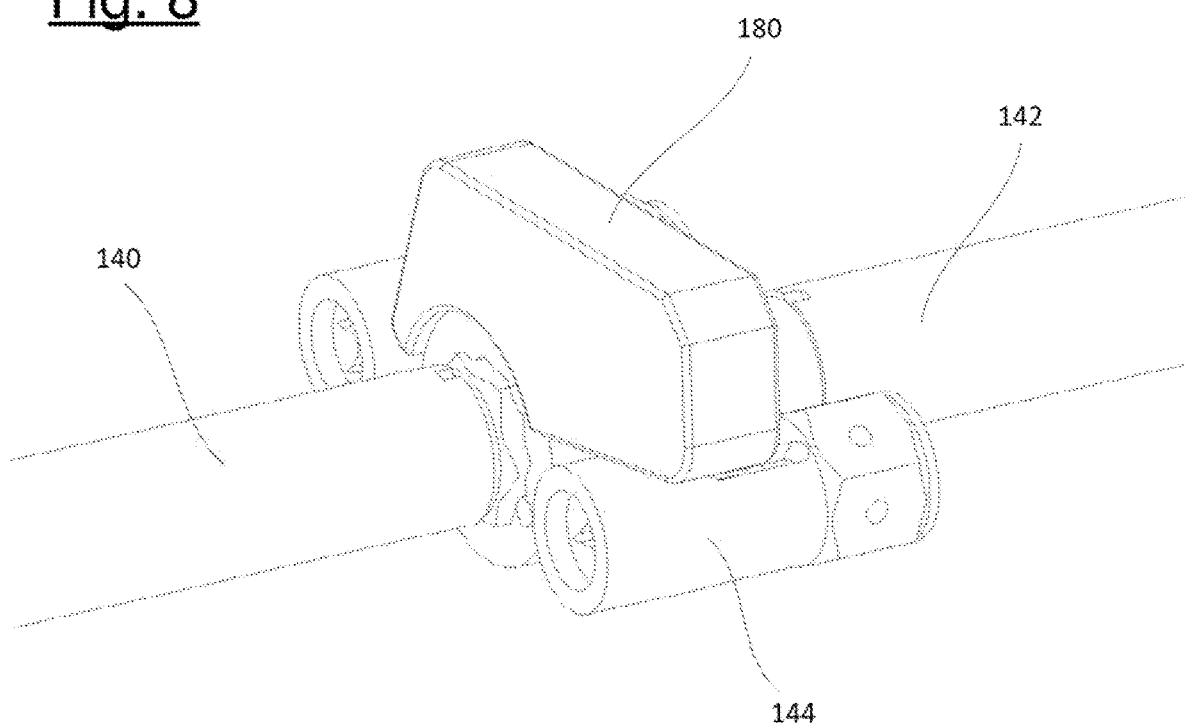

FIG. 8 shows the state in which the assembly tool 180 engages the pressure piece 144 in order to apply a screwing force onto the pressure piece 144.

Figure 9:
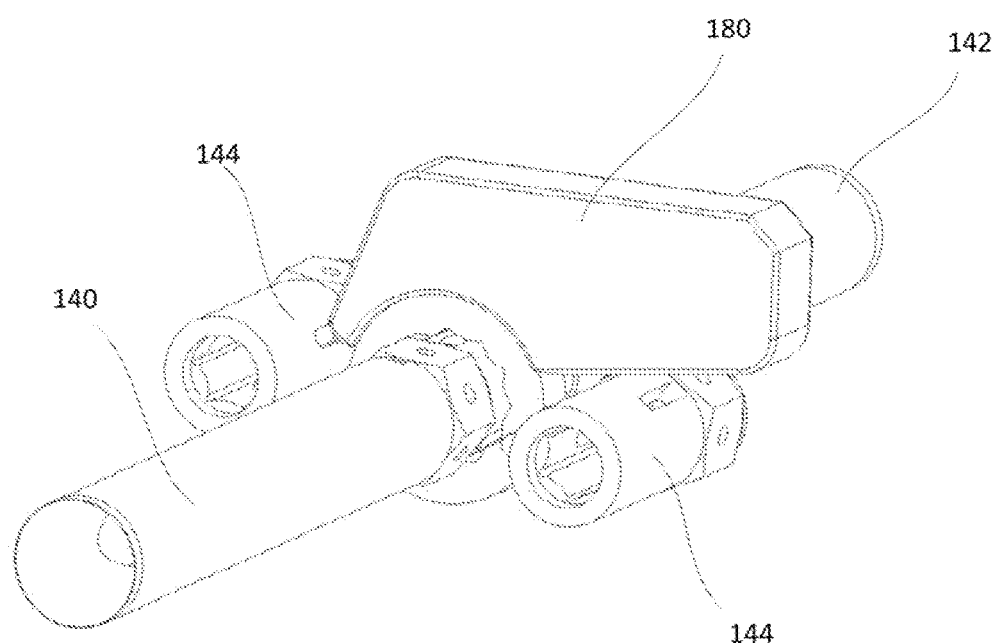

With respect to FIG. 9, after having rotated the pressure piece 144 for screwing the corresponding bolt 146, the assembly tool 180 can by axially moved back into the first axial region 168 in order to be released or rotated for repositioning to be again moved onto the tool engaging portion 160.

At this point, it is noted that at least two bolts 146 and at least two pressure pieces 144 form together a kit or assembly kit for mounting two rotor blade segments.

Figure 10A:
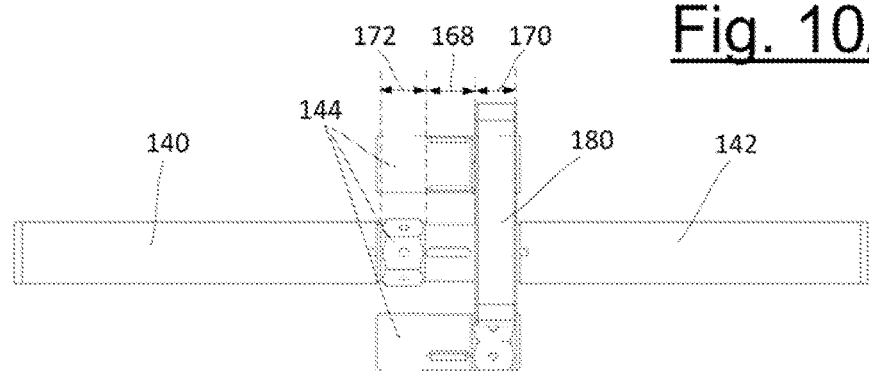
FIGS. 10A to 10D show an installation procedure according to an embodiment of the disclosure; and,
FIG. 11 shows a schematic flow chart of a method for joining two rotor blade segments according to an embodiment of the disclosure.
Figure 10B:
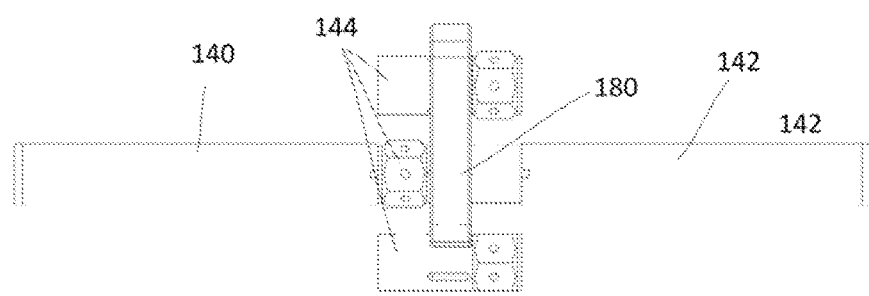
Figure 10C:
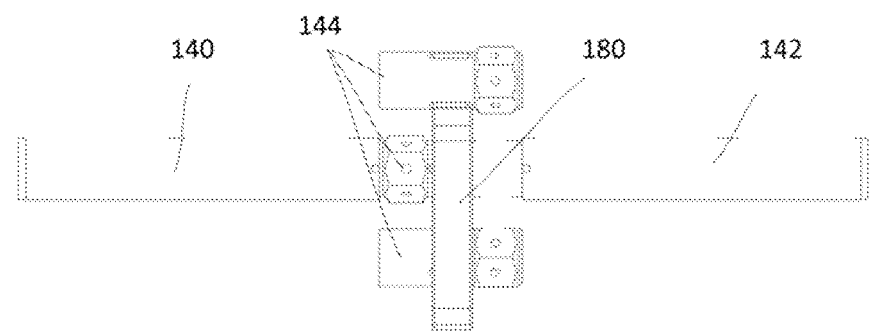
Figure 10D:
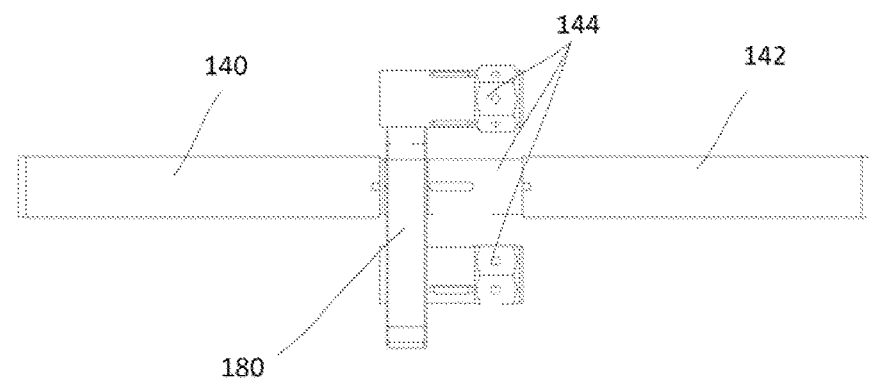
Figure 11:
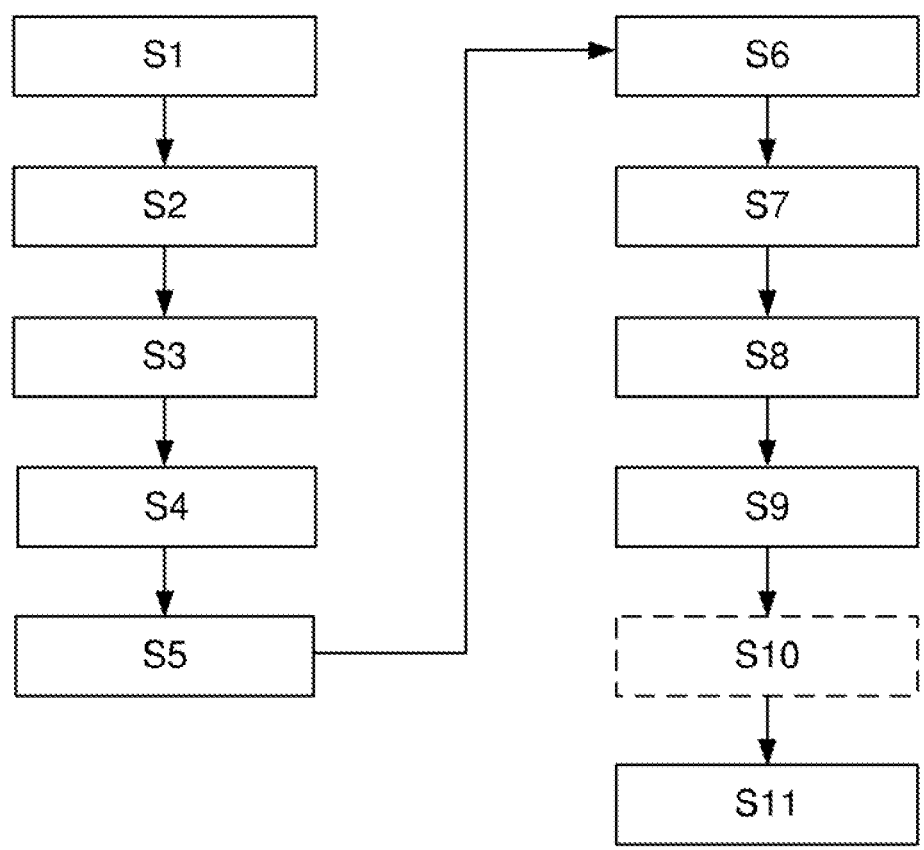

FIGS. 10A to 10D show a method for connecting two segments 132, 134 with the help of the flow chart of FIG. 11 according to an embodiment of the disclosure.

In a first step S1, connection bolts 146 are partially screwed into the first connection end 136 of the first rotor blade segment 132, in particular into first bushings 140, in such a way that the connecting bolts 146 project from the first connection end 136 (not shown).

In a further step S2, the sleeve-shaped pressure pieces 144 are provided as described above (not shown).

In a further step S3, the pressure pieces 144 are mounted to the connecting bolts 146 in a form-fit manner, wherein that two adjacent pressure pieces are arranged in each case rotated by 180° relative to one another (please refer to FIGS. 10A to 10D, showing this arrangement).

In a further step S4, the second connection end 138 of the second rotor blade segment 134 is brought close to the first connection end 136 of the first rotor blade segment 132 (not shown).

In a further step S5, the connecting bolts 146 are partially screwed into the second connection end 138 of the second rotor blade segment 134, in particular into second bushings 142 (not shown).

In a further step S6, the assembly tool 180 is attached to a first pressure piece 144 in the first axial region 168 relative to an adjacent second pressure piece 144 (see also FIGS. 6 and 7).

In a further step S7, the assembly tool 180 is aligned and axially moved along the first pressure piece 144 such that the assembly tool 180 engages the first pressure piece 144 in the tool engaging portion 160 (see FIG. 10A and FIG. 8). Thus, the tool 180 is moved into the second axial region 170.

In a further step S8, the corresponding connecting bolt 146 (not shown) is screwed at least partially by using the assembly tool 180 (see FIG. 10A).

In a further step S9, the assembly tool 180 is axially moved back into the first axial region 168 (see FIG. 10B).

If necessary, in a further step S10, the assembly tool 180 is repositioned in the first axial region 168 (free rotation around the cylindrical part of the pressure piece 144) and steps S7 to S9 are repeated.

Otherwise, in a further step S11, the assembly tool 180 is detached from the first pressure piece 144 and attached to the next, second pressure piece 144 (see FIG. 10C).

Now, steps S7 to S9 and possibly S10 are repeated, with the difference, that the tool 180 is moved to the third axial region in step S7 for screwing the respective pressure piece 144/bolt 146 (see FIG. 10D).

The embodiments as described above enables the functions, effects and advantages as listed in the introductory part of this writing. In particular, the pressure pieces 144 can be arranged very close to each other, while still the access and screwing by the assembly tool 180 is possible. Here it is noted that in the shown and described embodiments all pressure pieces 144 are formed identically.

It is understood that the foregoing description is that of the preferred embodiments of the invention and that various changes and modifications may be made thereto without departing from the spirit and scope of the invention as defined in the appended claims.

REFERENCE SIGNS 100 wind turbine
102 tower
104 foundation
106 nacelle
108 rotor
110 rotor blade
112 rotor hub
114 rotor blade root area
116 transition area
118 profile area
120 longitudinal extension direction
122 pressure side
124 suction side
126 rotor blade connection end
128 flange connection
130 division area
132 first rotor blade segment
134 second rotor blade segment
136 first connection end
138 second connection end
140 first bushing
142 second bushing
144 pressure piece
146 connection bolt
148 bolt connection
150 longitudinal axis
152 bore
154 first axial end
156 second axial end
158 first cylindrical section
160 tool engaging section
161 hole
162 second cylindrical section
163 slotted hole
164 outer diameter
166 outer diameter
168 first axial region
170 second axial region
172 third axial region
174-178 axial length
180 assembly tool
181 width
182 first clearance
184 second clearance
186 free space
188 engaging part
190 swing part
S1-S11 steps

The invention claimed is:

1. A wind turbine rotor blade comprising:
at least two rotor blade segments screwed together at respective connection ends via a plurality of connecting bolts;
a plurality of sleeve-shaped pressure pieces arranged between said at least two rotor blade segments, each of said plurality of sleeve-shaped pressure pieces being mounted on a corresponding one of said plurality of connecting bolts;
each of said plurality of said sleeve-shaped pressure pieces including at least one cylindrical section and a tool-engaging section for an assembly tool;
each of said plurality of sleeve-shaped pressure pieces being connected to the corresponding one of said plurality of connecting bolts in a form-fit manner so that a screwing force can be applied to the corresponding one of said plurality of connecting bolts by the assembly tool via the corresponding one of said plurality of sleeve-shaped pressure pieces;
said at least one cylindrical section having a cylindrical section diameter less than a diameter of said tool-engaging section; and,
each two adjacent ones of said plurality of sleeve-shaped pressure pieces being arranged rotated by 180° relative to one another so that— in a direction of a first of said at least two rotor blade segments toward a second of said at least two rotor blade segments— a first axial region is formed, in which said cylindrical sections of the two adjacent ones of said plurality of pressure pieces are opposite one another, a second axial region is formed, in which said tool-engaging section of a first of said plurality of sleeve-shaped pressure pieces is opposed to said cylindrical section of a second of said plurality of sleeve-shaped pressure pieces, and a third axial region is formed, in which said tool-engaging section of said second of said plurality of pressure pieces is opposed to said cylindrical section of said first of said plurality of pressure piece.

2. The wind turbine rotor blade of claim 1, wherein an axial length of said first axial region corresponds to at least a width of the assembly tool.

3. The wind turbine rotor blade of claim 1, wherein an axial length of at least one of said second and said third axial region corresponds to at least a width of the assembly tool.

4. The wind turbine rotor blade of claim 1, wherein a width of the assembly tool is 20 millimeters to 40 millimeters.

5. The wind turbine rotor blade of claim 1, wherein said plurality of sleeve-shaped pressure pieces are each formed by said cylindrical section having an axial length of at least twice the width of the assembly tool and said tool-engaging section having an axial length at least equal to the width of the assembly tool.

6. The wind turbine rotor blade of claim 5, wherein said plurality of sleeve-shaped pressure pieces each include a further cylindrical portion having a further axial length at least the width of the assembly tool, with said tool-engaging section being located between said cylindrical portion and said further cylindrical portion.

7. The wind turbine rotor blade of claim 1, wherein a diameter of each of said plurality of sleeve-shaped pressure pieces in the first axial region is such that the assembly tool is freely rotatable coaxially around said pressure piece in said first axial region.

8. The wind turbine rotor blade of claim 7, wherein said diameter of each of said plurality of sleeve-shaped pressure pieces in the first axial region is 64 mm, 74 mm, or 79 mm.

9. The wind turbine rotor blade of claim 7, wherein said diameter of each of said plurality of sleeve-shaped pressure pieces in the first axial region is at least 64 mm.

10. The wind turbine rotor blade of claim 7, wherein said diameter of each of said plurality of sleeve-shaped pressure pieces in the first axial region is at most 79 mm.

11. The wind turbine rotor blade of claim 1, wherein each two adjacent ones of said plurality of sleeve-shaped pressure pieces define a first clearance between each other in said first region and a second clearance between each other in at least one of said second axial region and said third axial region; and, said second clearance is smaller than said first clearance.

12. The wind turbine rotor blade of claim 11, wherein said second clearance is 10 millimeters or less.

13. The wind turbine rotor blade of claim 11, wherein said first clearance is a maximum clearance between said two adjacent ones of said plurality of sleeve-shaped pressure pieces.

14. The wind turbine rotor blade of claim 1, wherein said plurality of sleeve-shaped pressure pieces each include equally formed cylindrical sections at opposite ends.

15. The wind turbine rotor blade of claim 1, wherein said plurality of sleeve-shaped pressure pieces are identically formed.

16. A method of joining two rotor blade segments of the wind turbine rotor blade of claim 1, the method comprising the steps:
partially screwing the connecting bolts into a first connection end of a first of the two rotor blade segments such that the connecting bolts project from the first connection end;
providing the sleeve-shaped pressure pieces, each having the at least one cylindrical section with the cylindrical section diameter and the tool-engaging section for the assembly tool, wherein the cylindrical section diameter is less than the tool-engaging section diameter of the tool-engaging section;
form-fit mounting of the sleeve-shaped pressure pieces to the connecting bolts in such a way that two adjacent pressure pieces are arranged in each case rotated by 180° relative to one another;
bringing a second connection end of the second rotor blade segment close to the first connection end of the first rotor blade segment;
partially screwing the connecting bolts into the second connection end;
attaching the assembly tool to a first of the sleeve-shaped pressure pieces in the first axial region relative to an adjacent second of the sleeve-shaped pressure pieces;
at least one of aligning and axially moving the assembly tool along the first of the sleeve-shaped pressure pieces such that the assembly tool engages the first of the pressure pieces in the tool-engaging portion; and,
screwing a corresponding one of the connecting bolts with the assembly tool.

17. The method of claim 16, wherein:
after said screwing step, the assembly tool is axially displaced back into the first axial region; and,
the assembly tool is then removed and attached to the second pressure piece or the assembly tool is realigned by freely rotating it around the first pressure piece in the first axial region.

18. A kit for connecting two rotor blade segments of a wind turbine rotor blade, the kit comprising:
at least two connecting bolts for screwing the two rotor blade segments together;
at least two sleeve-shaped pressure pieces each configured to be applied to one of said at least two connecting bolts;
said at least two sleeve-shaped pressure pieces being arranged between the two rotor blade segments in a connected state of the two rotor blade segments;
each of said at least two pressure pieces including at least one cylindrical section and a tool-engaging section for an assembly tool, wherein said at least one cylindrical section has a cylindrical section diameter and said tool-engaging section has a tool-engaging diameter, and said cylindrical section diameter is smaller than said tool-engaging diameter;
each of said at least two pressure pieces being configured to be connected to a corresponding one of said at least two connecting bolts in a form-fit manner so that a screwing force can be applied to said corresponding one of said at least two connecting bolts by the assembly tool via the pressure piece;
said at least two pressure pieces, in the connected state of the rotor blade segments, being arrangeable adjacent to and rotated by 180° relative to one another such that—in a direction from a first of the two rotor blade segments toward a second of the two rotor blade segments—a first axial region is formed, in which said cylindrical sections of the two pressure pieces lie opposite one another, a second axial region is formed, in which the tool-engaging section of a first of said at least two sleeve-shaped pressure pieces is opposed to said cylindrical section of a second of said at least two pressure pieces, and a third axial region is formed, in which said tool-engaging section of said second of said at least two pressure pieces is opposed to said cylindrical portion of said first of said at least two pressure pieces.

19. A pressure piece for connecting two rotor blade segments of a wind turbine rotor blade, the pressure piece comprising:
a pressure piece body;
said pressure piece body being sleeve-shaped and having at least one cylindrical section with a cylindrical section diameter and a tool-engaging section for an assembly tool;
the pressure piece being configured to be applied to a connecting bolt via form-fit locking, so that a screwing force can be applied to the connecting bolt by the assembly tool via the pressure piece;
said tool-engaging section having a tool-engaging section diameter;
said cylindrical section diameter being less than said tool-engaging section diameter;
the pressure piece being configured such that in a connected state of the two rotor blade segments, in which the pressure piece is arranged between the two rotor blade segments, the pressure piece being arrangeable rotated by 180° relative to an adjacent further pressure piece, so that—in a direction from a first of the two rotor blade segments toward a second of the two rotor blade segments—a first axial region is formed, in which said cylindrical section and a further cylindrical section of the further pressure piece are opposed to each other, a second axial region is formed, in which said tool-engaging section is opposed to the further cylindrical portion of the further pressure piece, and a third axial region is formed, in which the tool-engaging section of the further pressure piece is opposed to said cylindrical section.

* * * * *